(12) United States Patent
Megiddo

(10) Patent No.: US 7,765,140 B1
(45) Date of Patent: Jul. 27, 2010

(54) SYSTEM FOR ENHANCING BUYERS PERFORMANCE IN ELECTRONIC COMMERCE

(75) Inventor: Nimrod Megiddo, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 2786 days.

(21) Appl. No.: 09/634,546

(22) Filed: Aug. 8, 2000

(51) Int. Cl.
G06Q 40/00 (2006.01)

(52) U.S. Cl. .......................... 705/37; 705/53

(58) Field of Classification Search .............. 705/1, 705/37, 53
See application file for complete search history.

(56) References Cited

U.S. PATENT DOCUMENTS

| | | | |
|---|---|---|---|
| 5,255,184 A | 10/1993 | Hornick et al. | 364/407 |
| 5,848,139 A | 12/1998 | Grover | 379/114 |
| 5,974,308 A | 10/1999 | Vedel | 455/407 |
| 6,199,099 B1* | 3/2001 | Gershman et al. | 709/203 |
| 6,347,307 B1* | 2/2002 | Sandhu et al. | 705/36 R |
| 6,446,261 B1* | 9/2002 | Rosser | 725/34 |
| 6,839,690 B1* | 1/2005 | Foth et al. | 705/53 |
| 6,937,995 B1* | 8/2005 | Kepecs | 705/14 |
| 2002/0095369 A1* | 7/2002 | Kaplan et al. | 705/37 |
| 2002/0161687 A1* | 10/2002 | Serkin et al. | 705/37 |
| 2003/0033212 A1* | 2/2003 | Sandhu et al. | 705/26 |
| 2003/0050895 A1* | 3/2003 | Dedrick et al. | 705/59 |
| 2004/0059669 A1* | 3/2004 | Togher et al. | 705/37 |
| 2005/0228748 A1* | 10/2005 | Togher et al. | 705/37 |
| 2010/0017324 A1* | 1/2010 | Brownhill et al. | 705/37 |

FOREIGN PATENT DOCUMENTS

WO WO9853415 11/1998

OTHER PUBLICATIONS

Webvan—http://web.archive.org/web/*/http://www.webvan.com.*
MySimon—http://web.archive.org/web/19981203074304/http://www.mysimon.com/.*

* cited by examiner

*Primary Examiner*—Pierre E Elisca
(74) *Attorney, Agent, or Firm*—IP Authority, LLC; Ramraj Soundararajan; Van Nguy

(57) ABSTRACT

A system and method enhance a buyer's performance by gathering information, presenting to sellers sophisticated buyers who do not pay more than the minimum and indicating to sellers when they are competitive, influencing them to lower prices. The system operates through a web site and creates a major web portal where a consumer obtains advice about prices of just about anything and initiates transactions using various services provided by the system. Fictitious user names are generated and used by the system to work with different sellers to generate and store specific quotes. This information is later used to purchase goods on behalf of buyers who do not want to reveal their identities. I addition, the system can also uncover hidden fee structures associated with sellers and businesses.

22 Claims, 10 Drawing Sheets

SYSTEM FOR ENHANCING BUYERS PERFORMANCE IN ELECTRONIC COMMERCE

BACKGROUND OF THE INVENTION

1. Field of Invention

The present invention relates generally to the field of electronic commerce. More specifically, the present invention is related to a system and a method for enhancing buyer's performance in electronic commerce.

2. Discussion of Prior Art

Commerce includes goods, services, financial instruments such as mortgages, securities, tickets, travel fares and accommodation, and more. FIG. 1 illustrates various methods of setting transaction prices 100 in electronic commerce, some of which are detailed below:

a) Posted prices 102: Seller posts all prices of item(s) or service(s) the seller provides, and it is up to the buyer to decide whether they like to pay such prices.

b) Quoted prices 104: Based on some information the seller has about the buyer, the seller quotes a personalized price to the buyer. Every seller that requires registration before releasing prices can "quote" rather than "post" a price.

c) Bid prices 106: Buyer commits to the seller to pay a price the buyer chooses.

d) Auctions and reverse auctions 108: Buyers compete on items for sale or sellers compete for supplying wanted items.

Naturally, sellers are better positioned to take advantage of the new opportunities offered by electronic commerce. Sellers maintain databases for tracking their sales so they can easily collect and process information about buyers and create buyer profiles. This allows the sellers to quote different prices to different customers and increase their profits. Without appropriate tools, buyers cannot do an extensive search for comparing prices, so they end up paying more than the minimum available price. For example, the process of finding the least expensive airfare is sophisticated enough to convince the buyers that they are getting the lowest fares available. The present invention overcomes these shortcomings and enhances buyers performance in such electronic commerce situations.

The following references describe prior art in the field of improving network commerce in general. All the prior art describing commercial transactions in a network (some of which are described below) are very similar to FIG. 1, but none relate to the present invention's method and system for enhancing buyers performance in electronic commerce.

U.S. Pat. No. 5,255,184 provides for an airline seat inventory control method and apparatus for computerized airline reservation systems. Described is an optimal reservation control using network-wide booking limits which takes into account the probabilistic nature of the demand.

U.S. Pat. No. 5,848,139 discloses a telecommunication traffic pricing control system wherein a price controller implements a pricing strategy that is dependent on past changes in telecommunications traffic volume on the trunk group and past changes in price of delay tolerant calls, and preferably implements a set of fuzzy logic rules.

U.S. Pat. No. 5,974,308 teaches a cellular phone system that optimizes user demand by charging system subscribers according to a variable charge rate that is based on the price elasticity of subscribers. Service providers continuously determine a charge rate that can be tailored to a specific subscriber category according to a number of variables which optimizes the individual cell capacity and the overall system capacity.

World Patent No. WO 98/53415 provides a method for incorporating psychological effects such as price thresholds and promotional activity into a demand model. First, the original demand model is modified to include a mechanism to convert actual prices into perceived prices, thus causing the demand model to predict higher demand for certain prices. Then, the user modifies the function to convert from real prices to perceived prices. This modified demand function is then fitted to a sales history to yield the parameters appropriate to its particular form.

There also exist website services that search the web on behalf of the user to find sites offering the best deals on products a buyer is interested in purchasing. However, these website services fall short of bargaining on behalf of the prospective buyer.

In all the above described systems there is no mention of enhancing buyers performance in an electronic commerce scenario. Present commercial transactions are limited by sellers being better positioned to take advantage of new opportunities offered by electronic commerce. Whatever the precise merits, features and advantages of the above cited references, none of them achieve or fulfill the purposes of the present invention. The current invention puts the buyer's interests ahead of the sellers and provides for an enhanced buyer performance system in an electronic commerce situation. These and other objects are achieved by the detailed description that follows.

SUMMARY OF THE INVENTION

The system enhances buyers performance by gathering information, presenting to sellers sophisticated buyers who do not pay more than the minimum and indicating to sellers when they are competitive, influencing them to lower prices.

In one embodiment, the system operates through a web site and creates a major web portal where a consumer may obtain advice about prices of just about anything and will be able to initiate transactions using various services provided by the system. Although the system is meant to help the end consumer, it may also be used by businesses when they need to buy from other businesses. In another embodiment, the system uses fictitious user names and works with different sellers to generate and store specific quotes. This information is later used to purchase goods on behalf of buyers who do not want to reveal their identities. As a further embodiment, the system can also uncover hidden fee structures associated with sellers and businesses.

DESCRIPTION OF THE PREFERRED EMBODIMENTS

Figure 1:
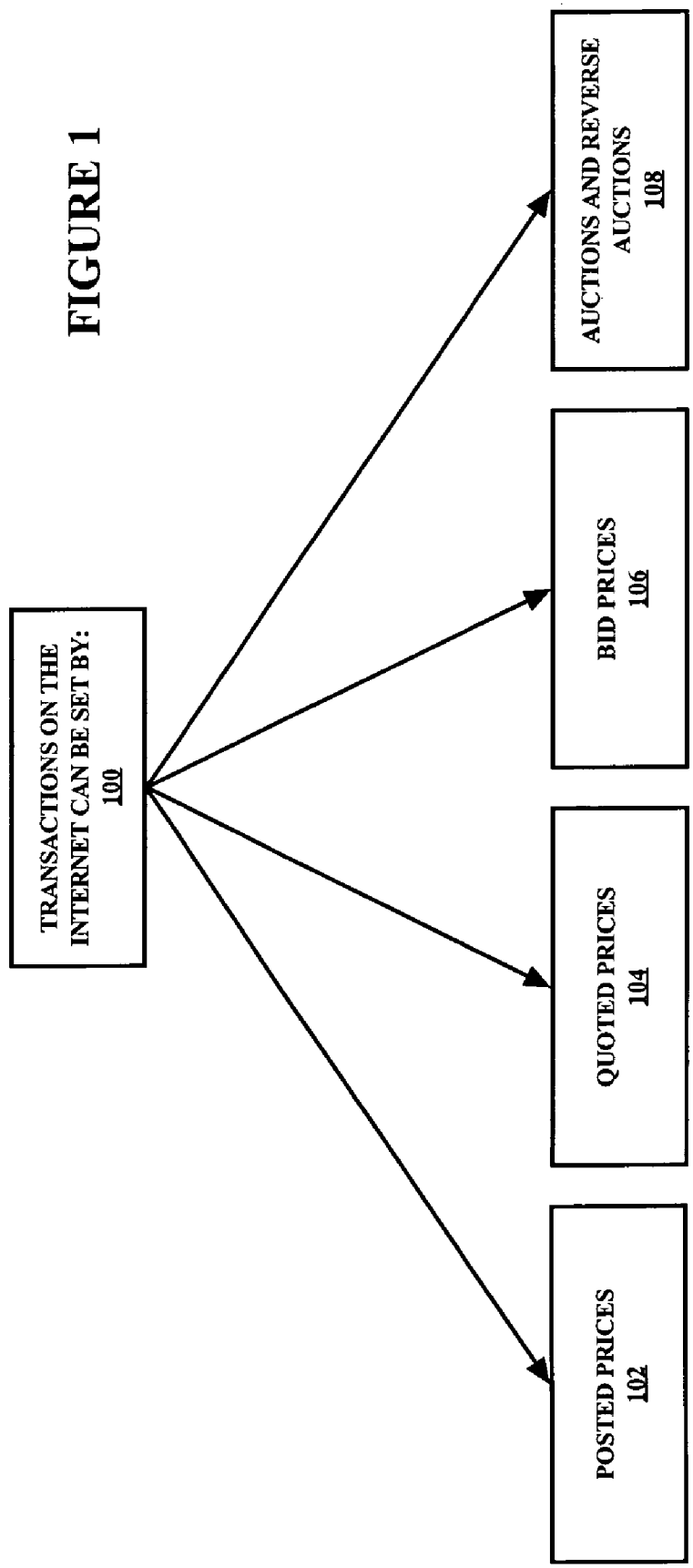
FIG. 1 illustrates different means of transacting commercially on the Internet.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

Figure 2:
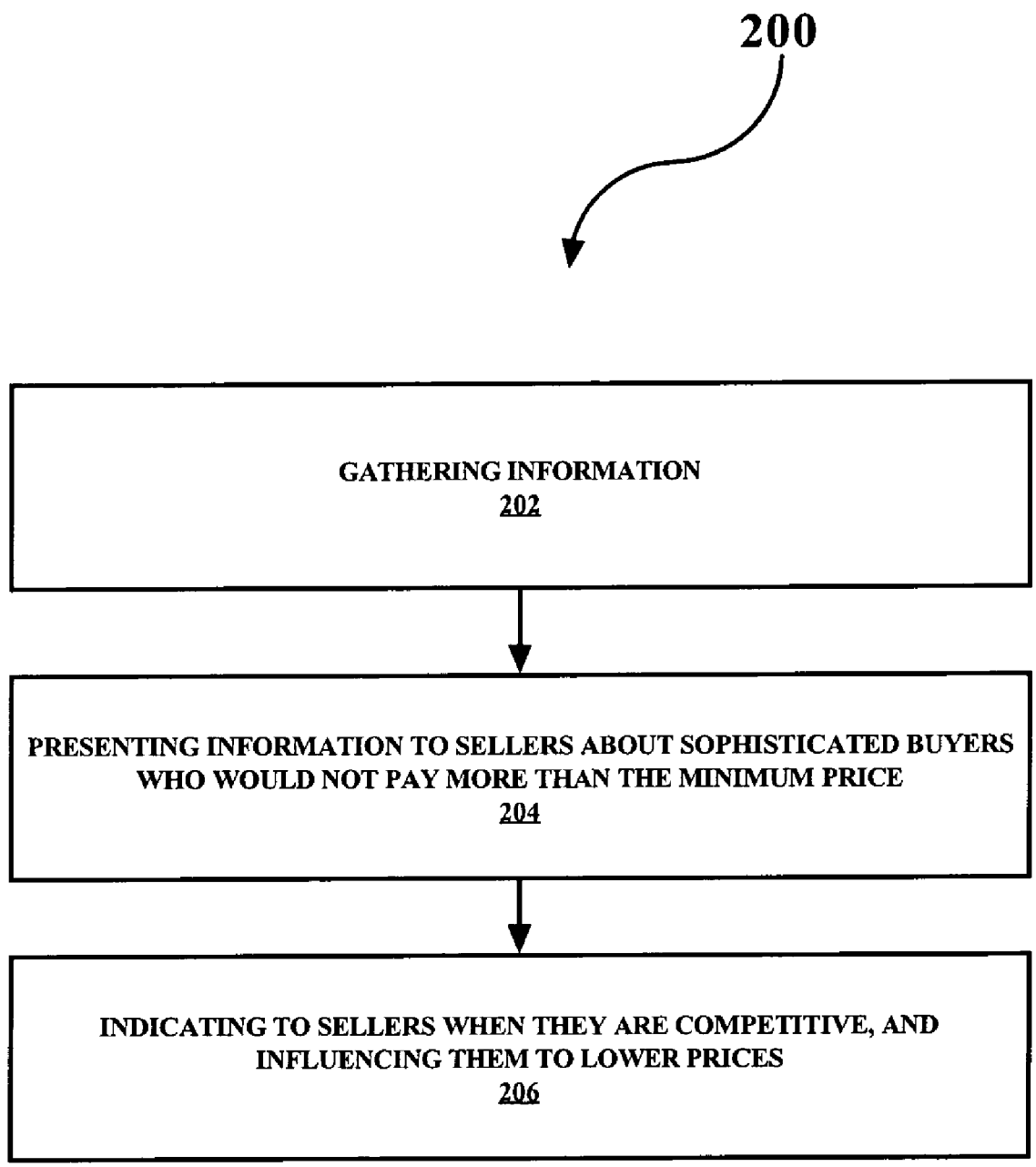
FIG. 2 illustrates the general architecture of the system.

FIG. 2 illustrates the fundamental architecture of the present system 200 which helps enhance buyers performance by gathering information 202, presenting to sellers 204 sophisticated buyers who do not pay more than the minimum and indicating to sellers 206 when they are competitive, influencing them to lower prices.

In one embodiment, the system operates through a web site and offers buyers several facilities where a consumer may obtain advice about prices of just about anything and will be able to initiate transactions using various services provided by the system. Although the system is meant to help the end consumer, it may also be used by businesses when they need to buy from other businesses. Sometimes big companies like IBM pay higher prices for items that they can buy for less if they used a different identity. Discussed below are some of the methods associated with the current invention.

Figure 3:
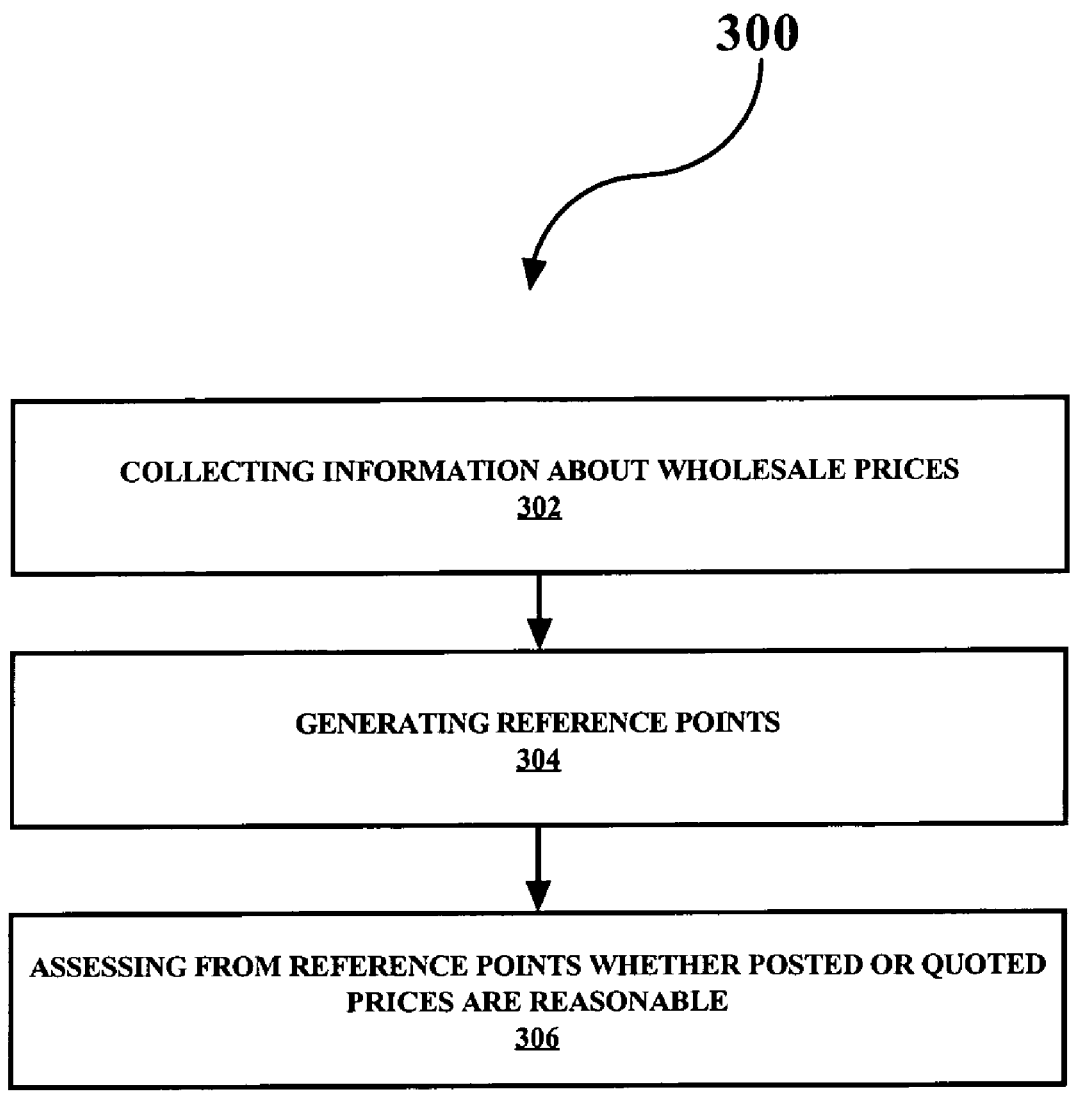
FIG. 3 illustrates a method of surveying wholesale prices.

FIG. 3 illustrates the method 300 of the current invention that surveys wholesale prices. As a first step, the system collects information 302 regarding wholesale prices associated with different items. Next, the system generates reference points 304 for each of said items. Lastly, the system utilizes said reference points to assess 306 whether or not posted or quoted prices are reasonable.

Figure 4:
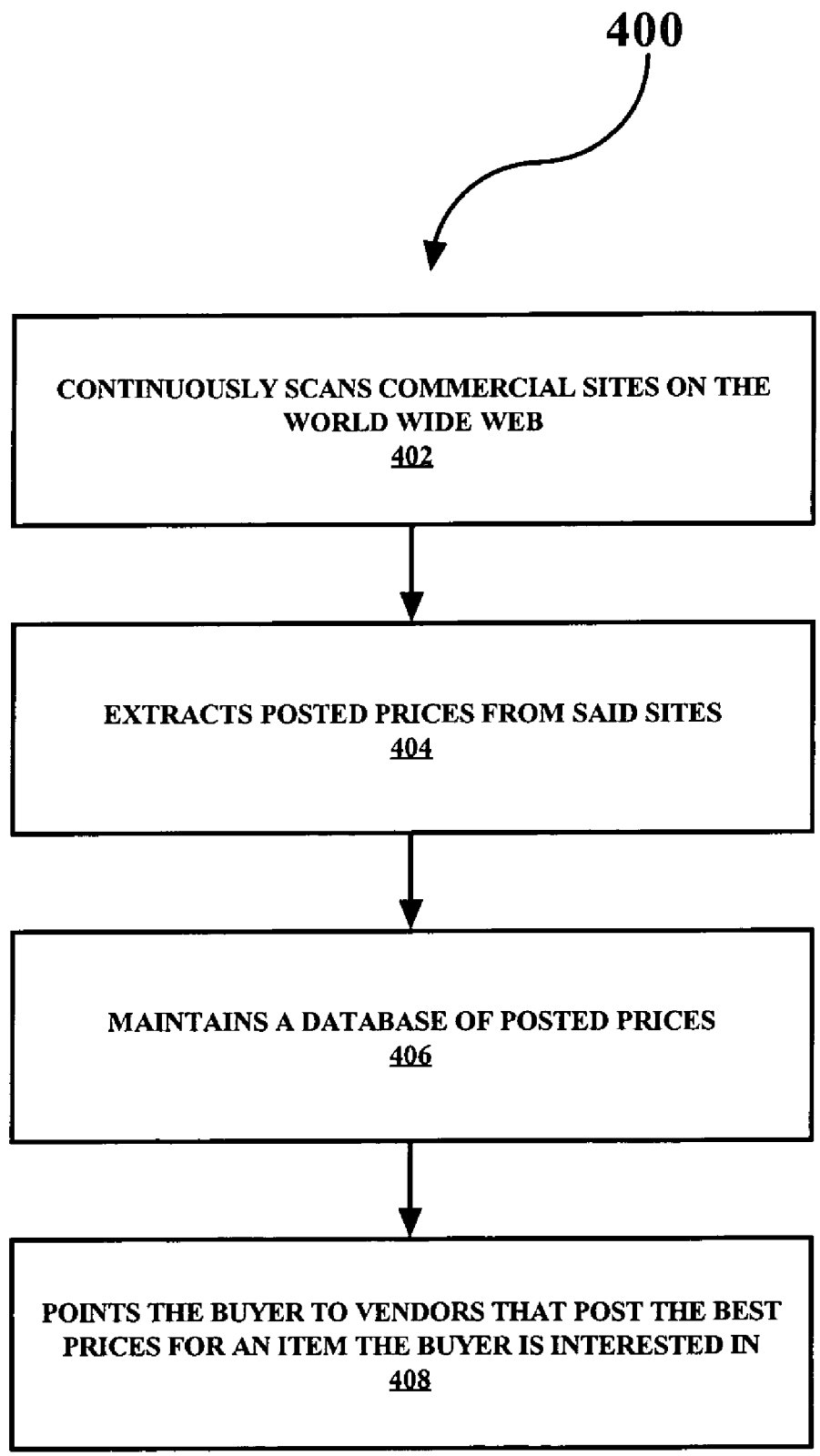
FIG. 4 illustrates a method of surveying posted prices.

Another facility offered by the system, as illustrated by FIG. 4, is a method to survey posted prices. Commercial sites on the world-wide-web are continuously scanned 402 by the system to extract posted prices. Next, the system stores said extracted prices in a database 406 so that it can point 408 the buyer to vendors that post the best prices for an item in which the buyer is interested.

Figure 5:
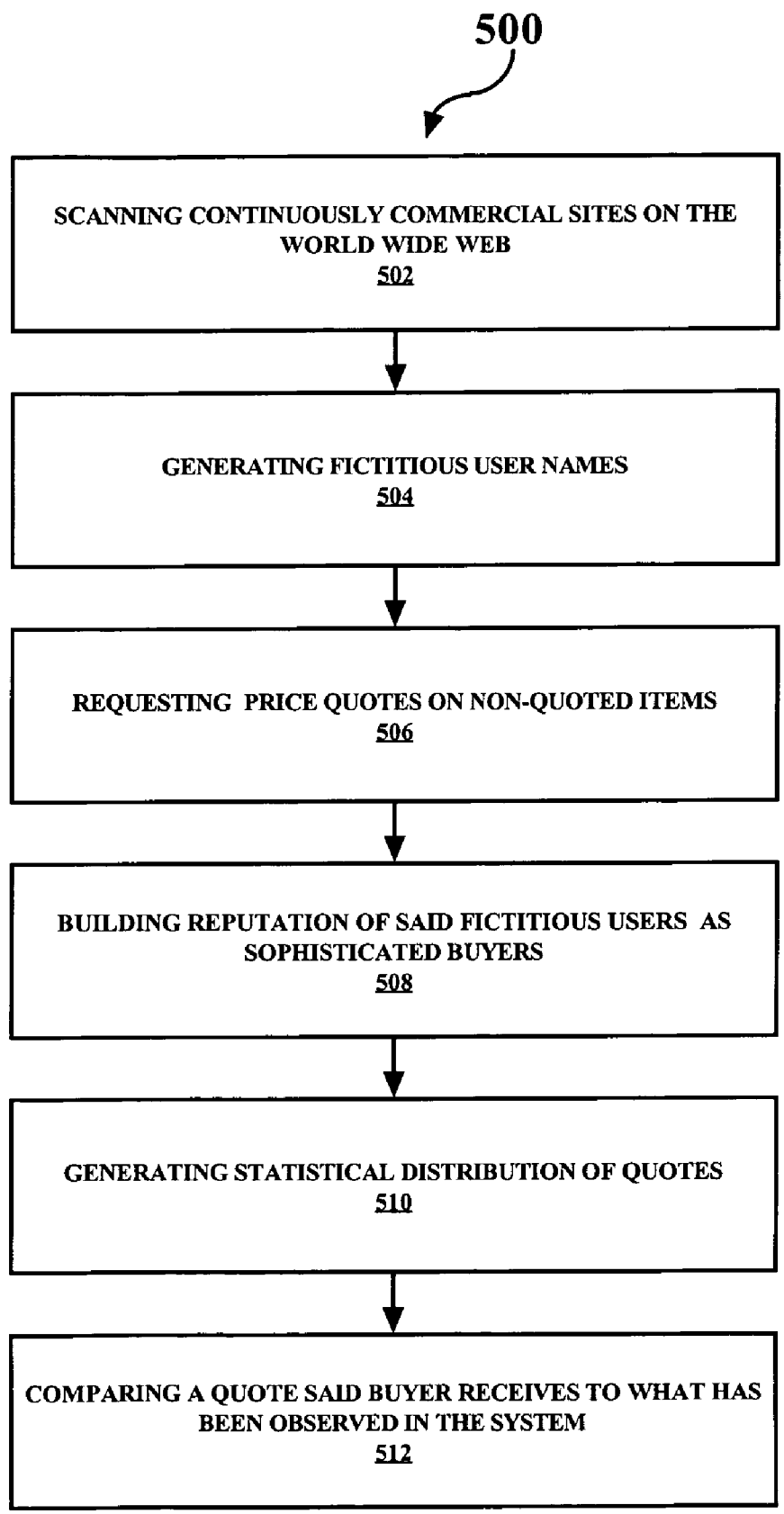
FIG. 5 illustrates a method of surveying quoted prices.

FIG. 5 illustrates the present invention's method of surveying quoted prices 500. The system continuously asks for price quotes 502 on non-quoted items at commercial sites. In order to obtain such quotes, the system generates fictitious user names 504 and works through different Internet service providers (ISP's) and requests price quotes 506 using said fictitious names so that the sellers believe they are quoting prices to real customers. Furthermore, the system creates such identities and builds for them reputations 508 as sophisticated buyers who know the market and are not willing to pay more than the minimum available price. The system is then able to generate statistical distributions 510 of quotes so that a buyer can compare 512 a quote he receives to what has been observed by the system.

Figure 6:
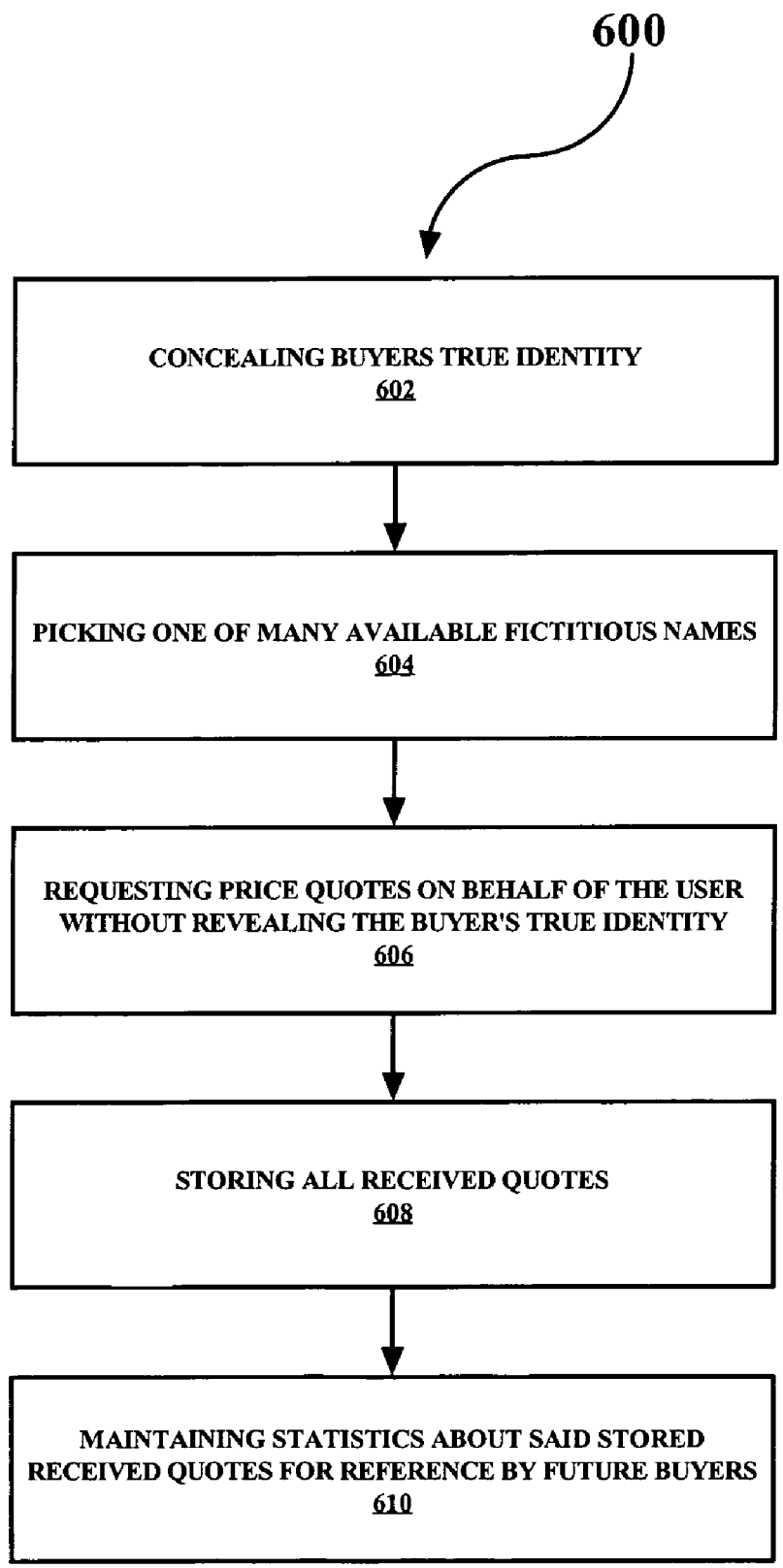
FIG. 6 illustrates a method of obtaining specific quotes.

Another part of the invention is a method for obtaining specific quotes 600, as illustrated in FIG. 6. First, the system conceals the buyer's true identity 602 and as a next step the system picks one of many available fictitious names 604 and uses the fictitious name to request a price quote 606 on behalf of the buyer. Said fictitious user names are picked from a list of names that have already built a reputation as a smart buyer (as explained above). Then, the system stores all the quotes 608 it has received and maintains statistics 610 about them for reference by future buyers.

Figure 7:
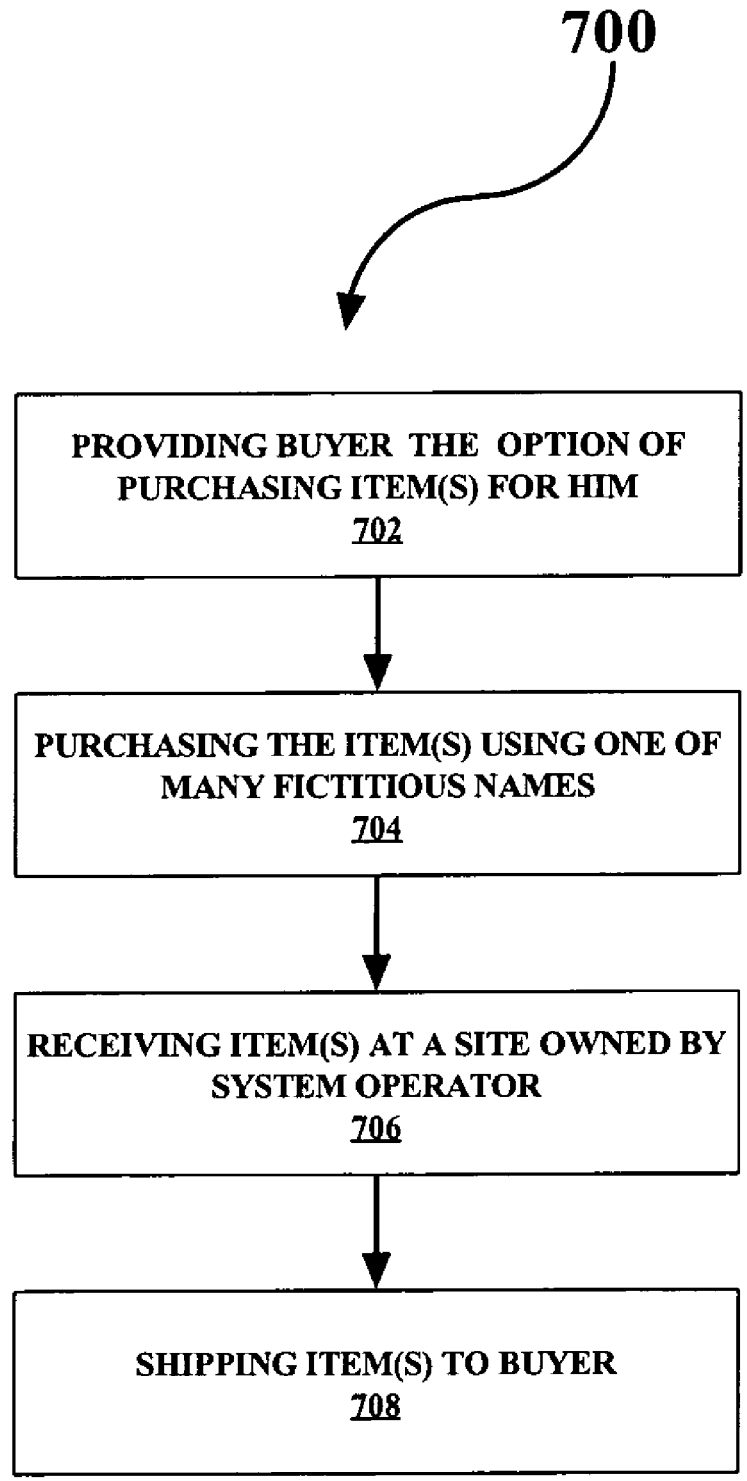
FIG. 7 illustrates a method of protecting buyers anonymity.

As an extension to the embodiment described above, the method for purchasing on behalf of buyers and protecting buyer's anonymity is carried a step further, as described in FIG. 7. The method 700 provides the buyer with the option of purchasing items 702 for him so that the buyer does not have to disclose to the seller any information about himself. A purchase is made by the system using one of many fictitious names 704 that have built a reputation as a smart buyer. Included in the method 700 is an option to receive the item 706 at a site owned by the system operator, and shipping it from that site 708 to the true buyer.

Figure 8:
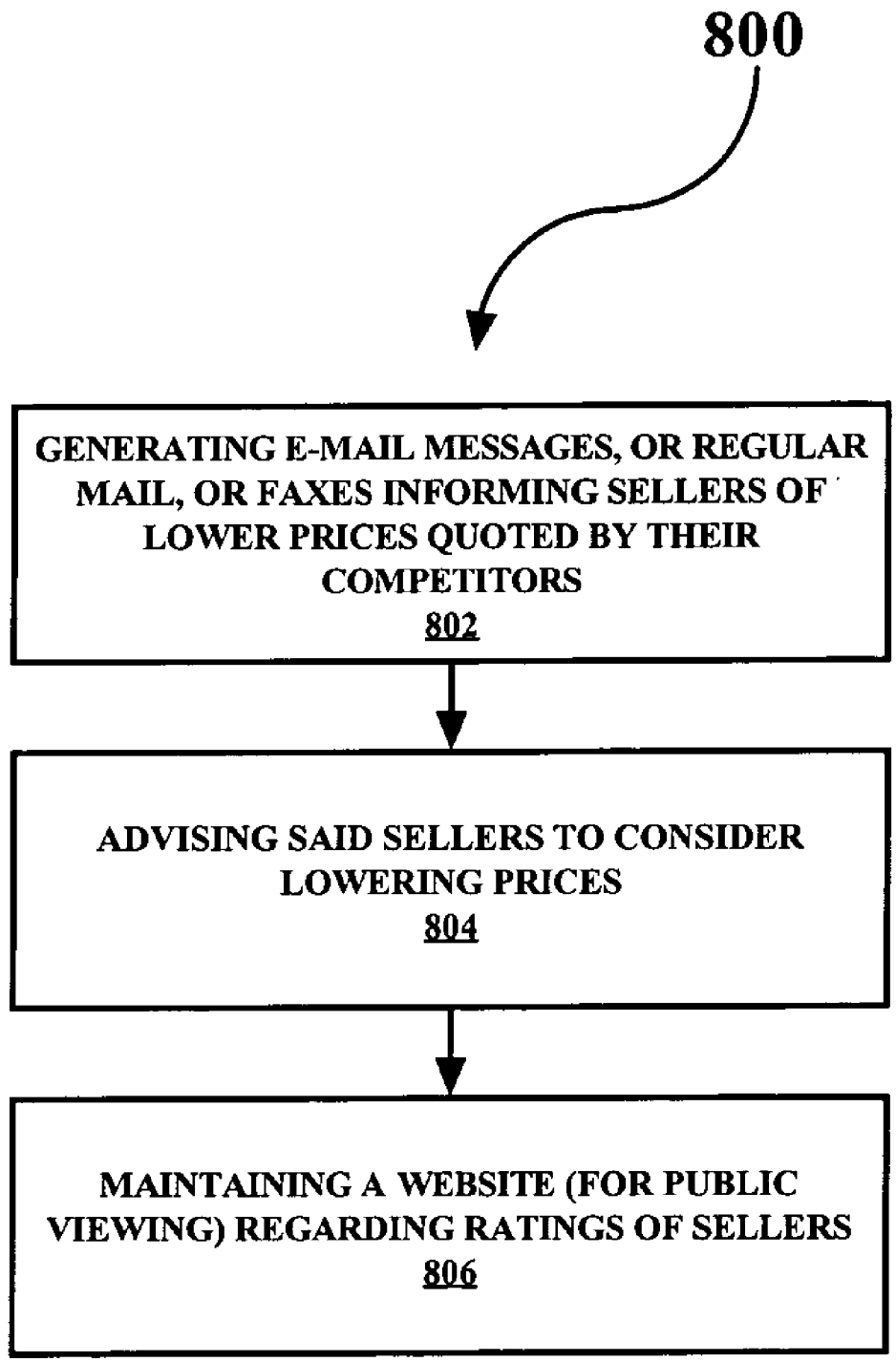
FIG. 8 illustrates a method for promoting competition among sellers.

FIG. 8 illustrates the present invention's method 800 for promoting competition among sellers. Generated in the system are e-mail messages, regular mail and faxes 802 informing sellers of lower prices quoted by their competitors and advising them 804 when they should consider lowering their prices. In addition, the system also maintains, on its website, for public viewing ratings of sellers as sellers who overcharge versus sellers who offer attractive prices 806.

Figure 9:
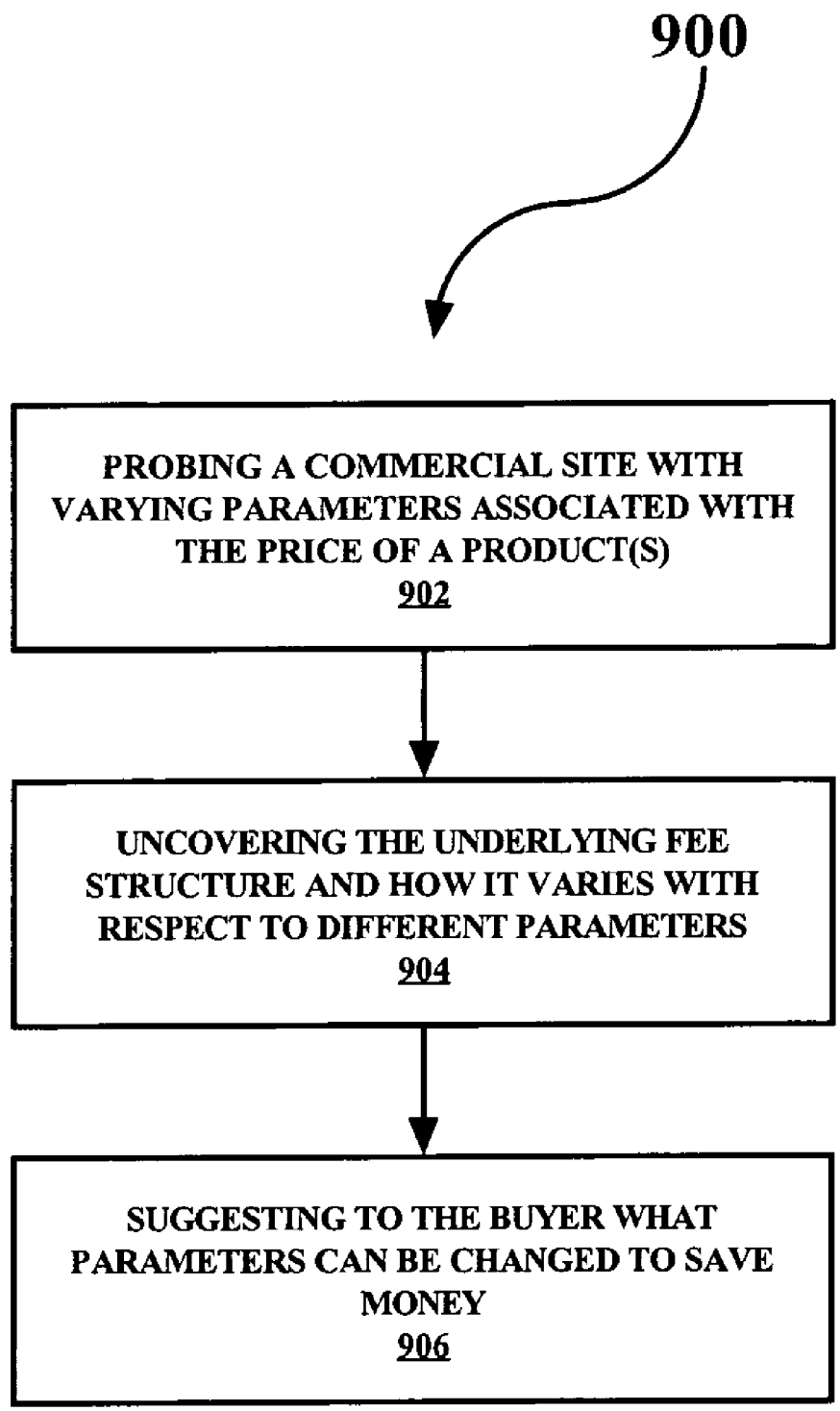
FIG. 9 illustrates a method for uncovering price structures.

Another part of the current invention is a method 900 to uncovering price structures as illustrated in FIG. 9. This service applies specifically to the airfare market. Airlines do not publish their fare structure. For example, they do not make it clear how the fare depends on the time of the day, the day of the week and the date. The buyer tells the desired time of travel and the airline returns a fare. Airline fares are repeatedly probed 902 by the present system for uncovering such structures 904. It then suggests to the buyers 906 how money can be saved by changing the requested time of the day, day of the week, etc.

In addition to the above described methods, the system maintains a pair of databases. First of said databases stores a list of alternate products, services, and competing sellers. With aid of said database, the system offers the buyer alternatives that save them money, either by buying from a different vendor or by buying an alternative product. Second of said databases collects and maintains customers feedback. The system collects feedback from customers about the quality of products and service by sellers and makes the information available to future clients.

Figure 10:
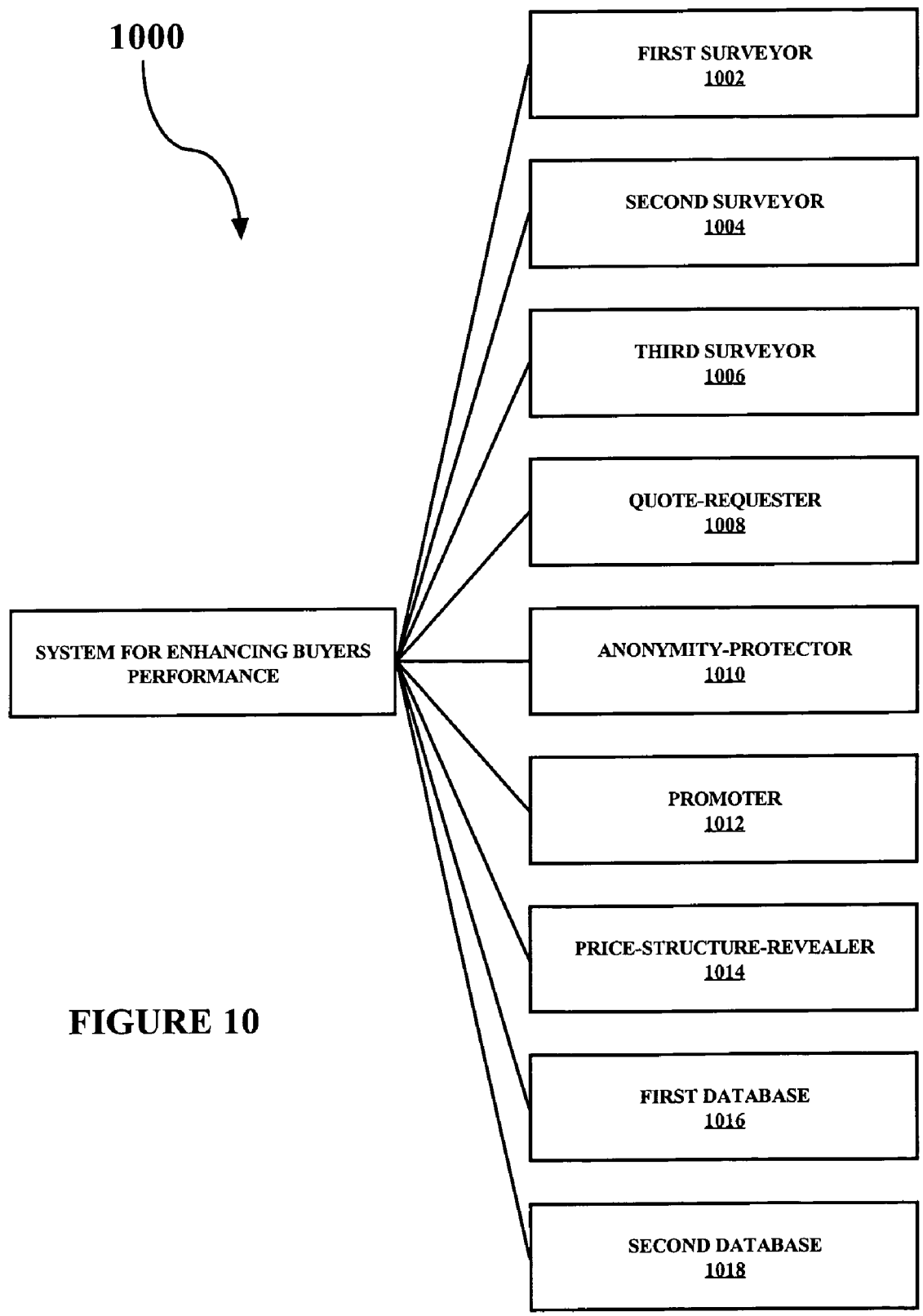
FIG. 10 illustrates a system for enhancing buyers performance in electronic commerce.

All the above methods can be implemented in a system as shown in FIG. 10 wherein said system 1000 comprises a first surveyor 1002 for surveying posted prices, a second surveyor 1004 for surveying posted quotes, and a third surveyor 1006 for surveying quoted prices. Also included is a quote-requester 1008 for obtaining specific quotes and an anonymity-protector 1010 for protecting buyers anonymity. The system further consists of a promoter 1012 for promoting competition among sellers and a price-structure-revealer 1014 for uncovering underlying fee structures. Also maintained is a first database 1016 for storing alternate products, services, and competing sellers, and a second database 1018 for collecting feedback from customers. The system thus enhances buyers performance by gathering information, presenting to sellers sophisticated buyers who do not pay more than the minimum and indicating to sellers when they are competitive, influencing them to lower prices.

The above enhancements and its described functional elements are implemented in various computing environments. For example, the present invention may be implemented on a conventional IBM PC or equivalent, multi-nodal system (e.g. LAN) or networking system (e.g. Internet, WWW or wireless web). The system and method may be performed locally, across networks or a combination thereof in a distributed environment. Communication mediums include, but are not limited to, conventional telephony mediums as well as wireless, RF, satellite, infrared, microwave, etc. All programming and data related thereto are stored in computer memory, static or dynamic, and may be retrieved by the user in conventional computer storage, display (i.e. CRT) and/or hardcopy (i.e. printed) formats. The programming of the present invention may be implemented by one of skill in the art of electronic commerce.

CONCLUSION

A system and method has been shown in the above embodiments for the effective implementation of a system for enhancing buyers performance in electronic commerce. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware. In addition, the specific methods for transacting via electronic commerce are representative of the preferred embodiment and should not limit the scope of the invention.

The invention claimed is:

1. A system for enhancing price discovery of products available in electronic commerce, wherein said system comprises:
   one or more automated surveyors for surveying a plurality of: posted prices, bid prices, posted quotes, quoted prices, and auctions;
   an anonymous buyer profile, said anonymous buyer profile used multiple times to develop historical usage thereof, said historical usage representing a sophisticated buyer and included within at least one of said one or more automated surveyors, said sophisticated buyer used as the buyer by said automated surveyors, and
   wherein use of said anonymous buyer profile increases the probability of discovering the best prices in an electronic commerce environment which includes electronic price discrimination.

2. A system for enhancing price discovery in electronic commerce, as per claim 1, wherein said developed anonymous buyer profile is used to make actual purchases for a buyer using said system without disclosing the true identity of said buyer.

3. A system for enhancing price discovery in electronic commerce, as per claim 2, wherein when said system makes actual purchases for a buyer it further includes: receiving purchased at least one item at a site owned by system operator or a third party, and
   shipping at least item to said buyer.

4. A system for enhancing price discovery in electronic commerce, as per claim 1, wherein said surveying posted prices further comprises:
   collecting information about wholesale prices;
   generating reference points, and
   assessing from said reference points whether a posted price is reasonable.

5. A system for enhancing price discovery in electronic commerce, as per claim 1, wherein said surveying posted quotes further comprises:
   scanning continuously commercial sites on a network;
   extracting posted quotes from said sites;
   maintaining a database of posted quotes, and
   pointing a buyer to vendors that post a best price based on said posted quotes for an item the buyer is interested in.

6. A system for enhancing price discovery in electronic commerce, as per claim 1, wherein said included within at least one of said one or more automated surveyors comprises:
   choosing one of a plurality of available fictitious names;
   requesting price quotes on behalf of said chosen fictitious names;
   storing all received quotes, and
   maintaining statistics about said stored received quotes for reference to future buyers using said system.

7. A system for enhancing price discovery in electronic commerce, as per claim 1, wherein said system further comprises:
   promoting competition among sellers by:
   generating messages to inform sellers of lower prices quoted by their competitors;
   advising said sellers to consider lowering prices, and
   maintaining a website, for public viewing, regarding ratings of sellers.

8. A system for enhancing price discovery in electronic commerce, as per claim 1, wherein potential buyers receive messages of prices discovered by any of: e-mail, regular mail, or faxes.

9. A system for enhancing price discovery in electronic commerce, as per claim 1, wherein said method of uncovering price structures further comprises:
   probing a commercial site with varying parameters associated with the price of at least one product;
   uncovering the underlying fee structure and how it varies with respect to different parameters, and
   suggesting to a potential buyer what parameters can be changed to save money.

10. A system for enhancing price discovery in electronic commerce, as per claim 1, wherein said network includes any of the: Internet, WWW, wireless web, LAN or WAN.

11. A method for enhancing buyers performance in electronic commerce, wherein said method comprises:
    electronically presenting information to sellers located across a network about sophisticated buyers who are not willing to pay more than a minimum price, said sophisticated buyers developed by historical use of anonymous buyer profiles;
    using said sophisticated buyers to electronically gather information about prices on a network, and
    indicating to sellers when they are competitive, and influencing them to lower prices.

12. A method for enhancing buyers performance in electronic commerce, as per claim 11, wherein said influencing them to lower prices comprises any of:
    generating messages to inform sellers of lower prices quoted by their competitors;
    advising said sellers to consider lowering prices, and
    maintaining a website, for public viewing, regarding ratings of sellers.

13. A method for enhancing buyers performance in electronic commerce, as per claim 11, wherein said sophisticated buyers are used to anonymously make actual purchases for a buyer using said method.

14. A method for enhancing buyers performance in electronic commerce, as per claim 13, wherein when said method anonymously makes actual purchases for a buyer it further includes: receiving purchased item(s) at a site owned by system operator or a third party, and
    shipping item(s) to said buyer.

15. A method for enhancing buyers performance in electronic commerce, according to claim 11, wherein said network includes one of the: Internet, WWW, wireless web, LAN or WAN.

16. A method for enhancing buyers performance in electronic commerce comprising:
surveying quoted prices located across a network, comprising the steps of:
generating fictitious user names;
requesting price quotes using said fictitious name(s);
building reputation of said fictitious name(s) as sophisticated buyer(s);
continuously scanning commercial sites on a network using said sophisticated buyers to retrieve product price information, including at least quotes;
generating statistical distribution of said quotes, and
comparing a quote a known buyer receives to what has been observed in the system by the sophisticated buyer.

17. A method for enhancing buyers performance in electronic commerce, according to claim 16, wherein said known buyer's anonymity is protected comprises the steps of:
providing buyer the option of purchasing item(s) for him;
purchasing the item(s) using one of many said available fictitious names;
receiving item(s) at a site owned by system operator, and
shipping item(s) to buyer.

18. A method for enhancing buyers performance in electronic commerce, according to claim 16, further comprising promoting competition among sellers comprising the steps of:
generating messages to inform sellers of lower prices quoted by their competitors;
advising said sellers to consider lowering prices, and
maintaining a website, for public viewing, regarding ratings of sellers.

19. A method for enhancing buyers performance in electronic commerce, according to claim 18, wherein said messages generated include one of the following: e-mail, regular mail, or faxes.

20. A method for enhancing buyers performance in electronic commerce, according to claim 16, further comprising a method of uncovering price structures by:
probing a commercial site with varying parameters associated with the price of at least one product;
uncovering the underlying fee structure and how it varies with respect to different parameters, and
suggesting to the buyer what parameters can be changed to save money.

21. An article of manufacture comprising a computer user medium having computer readable program code embodied therein when executed by the computer which enhances buyers performance in electronic commerce, said system comprising:
computer readable code comprising one or more automated surveyors for surveying any of: posted prices, bid prices, posted quotes, quoted prices, and auctions;
computer readable code comprising an anonymous buyer profile used multiple times to develop historical usage thereof, said historical usage representing a sophisticated buyer and included within at least one of said one or more automated surveyors, said sophisticated buyer used as the buyer by said automated surveyors, and
wherein use of said anonymous buyer profile increases the probability of discovering the best prices in an electronic commerce environment which includes electronic price discrimination.

22. An article of manufacture comprising a computer user medium having computer readable program code embodied therein which enhances buyers performance in electronic commerce, according to claim 21, wherein code for said automated surveyors using said one or more anonymous buyer profiles further comprises computer code for:
concealing a buyer's true identity;
picking one of many available fictitious names;
requesting price quotes on behalf of a buyer without revealing the buyer's true identity;
storing all received quotes, and
maintaining statistics about said stored received quotes for reference of future buyers.

* * * * *